US012658499B2

(12) United States Patent
Senthilnathan et al.

(10) Patent No.: US 12,658,499 B2
(45) Date of Patent: Jun. 16, 2026

(54) BATTERY MODULE

(71) Applicant: TVS MOTOR COMPANY LIMITED,
Chennai (IN)

(72) Inventors: Subbiah Senthilnathan, Chennai (IN);
Banarjee Anaugh, Chennai (IN);
Thangarajan Sivanesaselvam, Chennai
(IN)

(73) Assignee: TVS Motor Company Limited,
Chennai (IN)

( * ) Notice: Subject to any disclaimer, the term of this
patent is extended or adjusted under 35
U.S.C. 154(b) by 759 days.

(21) Appl. No.: 17/917,040

(22) PCT Filed: Mar. 24, 2021

(86) PCT No.: PCT/IN2021/050305
§ 371 (c)(1),
(2) Date: Oct. 5, 2022

(87) PCT Pub. No.: WO2021/205469
PCT Pub. Date: Oct. 14, 2021

(65) Prior Publication Data
US 2023/0155207 A1      May 18, 2023

(30) Foreign Application Priority Data
Apr. 9, 2020    (IN) ............................. 202041015498

(51) Int. Cl.
| | |
|---|---|
| *H01M 10/6551* | (2014.01) |
| *H01M 10/653* | (2014.01) |
| *H01M 10/6556* | (2014.01) |
| *H01M 50/289* | (2021.01) |

(52) U.S. Cl.
CPC ..... *H01M 10/6551* (2015.04); *H01M 10/653*
(2015.04); *H01M 10/6556* (2015.04); *H01M*
*50/289* (2021.01)

(58) Field of Classification Search
CPC ........... H01M 10/6551; H01M 10/653; H01M
10/6556; H01M 50/289; H01M 10/643;
H01M 10/613; H01M 10/6554; H01M
50/291; H01M 50/293; Y02E 60/10
See application file for complete search history.

(56) References Cited

U.S. PATENT DOCUMENTS

| | | | |
|---|---|---|---|
| 2002/0070445 A1* | 6/2002 | Tarter | H01L 23/4275 |
| | | | 257/E23.09 |
| 2010/0310919 A1* | 12/2010 | Villarreal | H01M 10/625 |
| | | | 429/120 |
| 2011/0151315 A1* | 6/2011 | Masson | H01M 50/526 |
| | | | 174/126.1 |
| 2015/0037626 A1 | 2/2015 | Malcom et al. | |
| 2017/0237116 A1* | 8/2017 | Shindo | H01M 4/624 |
| | | | 429/127 |
| 2018/0301773 A1* | 10/2018 | Sugiyama | H01M 50/24 |
| 2019/0115638 A1 | 4/2019 | Chen et al. | |
| 2019/0214618 A1* | 7/2019 | Nakamura | H01M 10/6235 |

FOREIGN PATENT DOCUMENTS

| | | | |
|---|---|---|---|
| EP | 2784869 A1 | | 10/2014 |
| JP | 2009123371 A | * | 6/2009 |
| TW | 201131863 A | | 9/2011 |
| WO | 2010141853 A1 | | 12/2010 |

OTHER PUBLICATIONS

International Search Report issued in corresponding International
Application No. PCT/IN2021/050305 mailed Jul. 14, 2021 (4
pages).
Written Opinion issued in corresponding International Application
No. PCT/IN2021/050305 mailed Jul. 14, 2021 (8 pages).

* cited by examiner

*Primary Examiner* — Muhammad S Siddiquee
(74) *Attorney, Agent, or Firm* — Osha Bergman Watanabe
& Burton LLP

(57) ABSTRACT

A battery module includes cells positioned in cell holders
and a casing. A cell support structure is integrated with a first
inner surface of the casing for establishing a thermal contact
between the cells and the first inner surface. Further, the
battery module includes a flexible member positioned
between a second inner surface of the casing and one of the
cell holders for exerting pressure on the cell holders. A
thermal interface member is in contact with at least one of
the cell holders. The flexible member, the thermal interface
member, and the cell support structure package the cells
efficiently, making the battery module mechanically stable,
impact resistant, and vibration proof.

9 Claims, 5 Drawing Sheets

700

OBTAIN A CASING AND A PLURALITY OF CELLS ENCLOSED IN A PLURALITY OF CELL HOLDERS

701

POSITION THE CELL HOLDERS IN THE CASING

702

SLIDE A FLEXIBLE MEMBER BETWEEN A SECOND INNER SURFACE OF THE CASING AND ONE OF THE CELL HOLDERS

703

BATTERY MODULE

TECHNICAL FIELD

The present subject matter relates to a battery module. More particularly, heat dissipation in the battery module is disclosed.

BACKGROUND

In recent years, rechargeable energy storage devices have been widely used as an energy source for a number of electronic and electrical units, hybrid and electric vehicles. Commonly used rechargeable energy storage devices include, for example, nickel cadmium batteries, nickel hydrogen batteries, nickel zinc batteries, and lithium rechargeable batteries. Lithium rechargeable energy storage devices are widely used in electric and hybrid vehicles because they are rechargeable, they can be made in a compact size with large capacity, they have a high operation voltage, and they have a high energy density per unit weight.

An existing energy storage device comprises one or more energy storage cells, such as, lithium ion battery cells enclosed within a casing. The electrochemical reactions with the lithium ion battery cells are responsible for the voltage and the current generated by the energy storage device. Also, during charging of the energy storage device, electrochemical reactions occur within the lithium ion battery cells. These electrochemical reactions are highly exothermic and the lithium ion battery cells tend to heat up during the course of normal operation. The increased temperatures of the lithium ion battery cells degrade the electrical performance of the energy storage device and may lead to catastrophic failure of the energy storage devices. There is a need to dissipate the generated heat and cool the lithium ion battery cells of the energy storage device for the safety and longevity of the energy storage device.

BRIEF DESCRIPTION OF DRAWINGS

The detailed description is described with reference to the accompanying figures. The same numbers are used throughout the drawings to reference like features and components.

DETAILED DESCRIPTION OF THE INVENTION

Figure 1A:
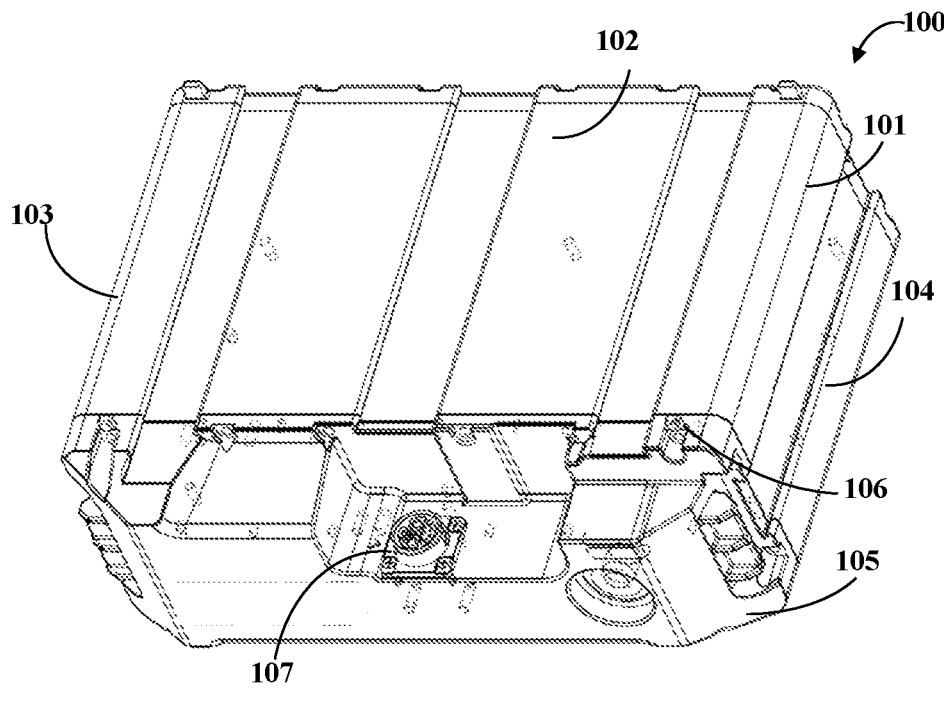
FIGS. 1A-1B exemplarily illustrate perspective views of a battery module, as pear an embodiment of the present invention.

Currently, for cooling the lithium ion battery cells in the energy storage device, coolant channels with air or a coolant liquid are designed around individual battery cells or a cluster of battery cells. However, the design of the coolant channels within the casing of the energy storage devices makes the energy storage device bulky and no longer compact for space-constrained varied applications. Also, maintaining the temperatures, the pressures, and the sealing of the coolant flow into and outside the energy storage device adds to the heat dissipation problem being addressed.

In another implementation for cooling of the energy storage device, and in turn the lithium ion battery cells, a heat exchange member in thermal contact with the casing of the energy storage device is used. The heat dissipated from the lithium ion battery cells has to traverse through air-filled gap between the cells and the casing. The heat transfer between the battery cells and the casing is not efficient since the air is a poor conductor of heat. In order to ensure that heat is effectively dissipated from the battery cells, it is essential to ensure that the heat generating battery cells are reliably secured to be in thermal contact with the heat exchange member proximal to the casing. Further, there is also a need to ensure that there is no air gap between an upper surface of the lithium ion battery cells and an inner surface of the outer casing, in order to ensure that heat is effectively transmitted to the metallic casing.

Typically, fasteners or clips are used to secure the lithium ion battery cells proximal to the casing of energy storage device for establishing thermal contact between the battery cells and the heat exchange members. Particularly, the use of clips/fasteners only aid in establishing thermal contact of side and/or front and/or rear surfaces of the battery cells with the casing, and through the casing with the heat exchange member. Further, based on the application of the energy storage device, the capacity of the energy storage device is varied. Based on the capacity of the energy storage device, the number of battery cells, the mass of the battery cells, and the capacity of the battery cells, etc., are varied. If battery cells with reduced size or mass are to be enclosed within an existing casing, a gap may be formed between the casing and the battery cells. Such gaps will result in ineffective heat transfer from the energy storage cells in the energy storage device. Also, due to variation in the shape and size of the fasteners, it is difficult to establish consistent and effective thermal contact between the battery cells and the heat exchange members.

Typically, heat conductive packaging material may be used to establish thermal contact of the battery cells with a surface of the outer conductive casing. The heat conductive packaging material needs to be uniformly distributed along the length of the casing between the casing and the surface of the battery cells using a fastening means. However, the packaging material increases the weight, the manufacturing cost, and the assembling cost of the energy storage device. Also, while loading or unloading the assembly of the energy storage cells into the casing, the packaging material may hinder the ease in pushing in or pulling out of the energy storage cells from the casing. If the heat conductive packaging material that is rigid and firm is used, it may not allow for the flexibility of using an existing casing for different assemblies of the energy storage cells. This may lead to manufacture of different casings for different assemblies of the energy storage cells increasing material cost and manufacture cost of entities. Thus, to address this problem, the packaging material has to be made adequately flexible as well as rigid to not deform, while loading and unloading of the assembly of the energy storage cells with efficient heat transfer properties. Also, the packaging material needs to take care of the marginal deviation or tolerances in design of the casing or the design of cell holders holding the battery cells for effective heat transfer from the energy storage cells to the casing.

Therefore, there exists a need for an improved design of an energy storage device with thermal contact between the battery cells and the casing of the energy storage device for efficient heat transfer from the battery cells with ease and safety during assembly, use, maintenance, and servicing of the energy storage device overcoming all problems disclosed above as well as other problems of known art.

The present subject matter discloses an energy storage device, that is, a battery module with battery cells in gap-less thermal contact with a casing of the battery module for effectively as well as efficiently dissipating the heat generated by the battery cells and cooling the battery cells for safety, longevity, and ease and safety during assembly, use, maintenance, and servicing of the energy storage device. Such a battery module may be employed in powered devices, such as, vehicles, for example, electric vehicle, hybrid electric vehicles, IC engine vehicles, etc.

In an embodiment of the present invention, a battery module for a powered device is disclosed. The battery module comprises multiple cells positioned in multiple cell holders. A casing encloses the cells in the cell holders. The casing comprises a first inner surface, a first outer surface, and a second inner surface. The battery module further comprises a cell support structure integrated with the first inner surface of the casing for establishing a thermally conducting and electrically insulating contact between the cells and the first inner surface. The battery module, in an embodiment, further includes a flexible member positioned between the second inner surface of the casing and one of the cell holders for exerting a pre-load pressure on the cell holders to establish the thermally conducting and electrically insulating contact between the cells and the first inner surface. The flexible member is longitudinally slacked forming a series of alternating crests and troughs.

In an embodiment, the battery module further comprises at least one thermal interface member in contact with at least one of the one or more cell holders for thermally conducting heat generated by the plurality of cells positioned in the one or more cell holders. In one embodiment, one thermal interface member is positioned between the flexible member and one of the cell holders. In this embodiment, another thermal interface member is positioned between one of the cell holders and the cell support structure. In another embodiment, only one thermal interface member is positioned between one of the cell holders and the cell support structure. The thermal interface member is firm at room temperature and softens and fills the gap between one of the one or more cell holders and the cell support structure at higher temperatures for preventing entrapment of air in the path of conduction of heat generated by the plurality of cells.

In an embodiment, the casing further comprises a first outer surface having a heat dissipating structure for dissipating heat generated by the cells in thermally conducting and electrically insulating contact with the first inner surface of the casing to external environment. The heat dissipating structure is multiple fins, coolant channels, or/and an aeration device. In an embodiment, a coupling member (208) is positioned between the flexible member and one of the one or more cell holders for efficiently packaging the plurality of cells to establish the thermally conducting and electrically insulating contact between the plurality of cells and the first inner surface. In an embodiment, a coupling member is positioned between the inner surface of the casing and the flexible member. The flexible member is inserted into a gap between the second inner surface of the casing and one of the cell holders after the assembly of the cell holders and the at least one thermal interface member.

In another embodiment, a method of assembly of a battery module is disclosed. The method comprises the steps of: obtaining a casing and a plurality of cells enclosed in a one or more cell holders, wherein the casing comprises a first inner surface, a first outer surface, and a second inner surface, and wherein a cell support structure is integrated with the first inner surface of the casing. Further, positioning the cell holders in the casing, wherein the plurality of cells in one of the one or more cell holders in a thermally conducting and electrically insulating contact with the cell support structure. Further, sliding a flexible member between the second inner surface of the casing and another one of the one or more cell holders for exerting pressure on the one or more cell holders to establish the thermally conducting and electrically insulating contact between the plurality of cells and the cell support structure.

In an embodiment, the method further comprises a step of inserting at least one thermal interface member between the flexible member and the another one of the one or more cell holders. In an embodiment, the method further comprises a step of inserting at least one thermal interface member between the one of the one or more cell holders and the cell support structure. In an embodiment, the method further comprises inserting a coupling member between the second inner surface of the casing and the flexible member. In an embodiment, the method comprises a step of inserting a coupling member between the flexible member and one of the one or more cell holders. In an embodiment, a heat dissipating structure is integral to a first outer surface of the casing for dissipating heat generated by the plurality of cells in the thermally conducting and electrically insulating contact with the first inner surface of the casing to external environment. The heat dissipating structure is at least one of a plurality of fins, a plurality of coolant channels, and an aeration device.

Figure 1B:
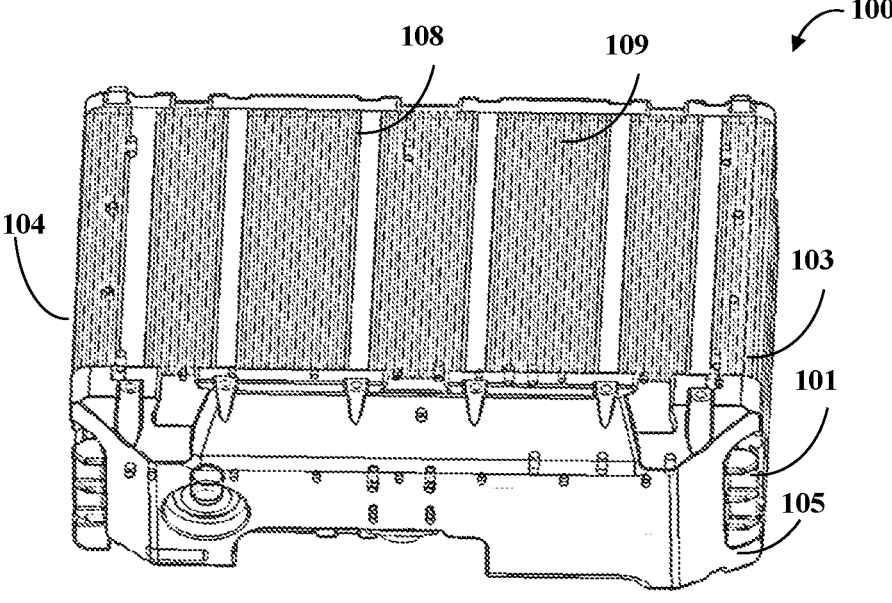

FIGS. 1A-1B exemplarily illustrate perspective views of a battery module 100, as per an embodiment of the present invention. FIG. 1A illustrates a top perspective view of the battery module 100. FIG. 1B also illustrates a top perspective view of the battery module 100, with the battery module 100 in FIG. 1A in an inverted orientation. As exemplarily illustrated in FIG. 1A, the battery module 100 comprises a casing 101 and a first end cover 105. The casing 101 is a hollow rectangular cover enclosing multiple cells and other electrical and electronic components, such as, a BMS board of the battery module 100. The casing 101 comprises enclosing walls 102 and 108 exemplarily illustrated in FIG. 1B, peripheral walls 103 and 104 between the enclosing walls 102 and 108, and open ends (not shown). End covers of the battery module 100 close the open ends of the casing 101. The casing 101 has mounting provisions, such as, 106 to mount the end covers, such as, the first end cover 105 and the second end cover (not shown) at the open ends of the casing 101 using attachment means. The end covers have external electrical connections, such as, 107 of the battery module 100 for charging and discharging of the battery module 100. As exemplarily illustrated, an outer surface of the enclosing wall 102 comprises a dovetail pattern that facilitates in easy mounting and unmounting of the battery module 100 in a designated space in a powered device. In an embodiment, both the enclosing walls 102 and 108 have the dovetail pattern. Corresponding, inner surfaces of the enclosing walls 102 and 108 also have the dovetail pattern.

In an embodiment, the outer surfaces of the peripheral walls 103 and 104 also have a dovetail pattern on them.

As exemplarily illustrated in FIG. 1B, the outer surface of the other enclosing wall 108 of the casing 101 comprises a heat dissipating structure 109, such as, fins. The cells (not shown) enclosed in the casing 101 generate heat and the heat is transferred to the casing 101 of the battery module 100 to be dissipated to the surroundings of the battery module 100. The heat dissipating structure 109 on the outer surface of the enclosing wall 108 facilitates the exchange of the heat transferred to the casing 101 with the air or a liquid coolant. The heat dissipating structure 109 may be the fins, coolant channels for air or a liquid, and/or an aeration device. The heat dissipating structure 109 extracts the heat in the casing 101 and cools the battery module 100 using either natural convection or forced convection based on the installation and the application of the battery module 100. From the cells to the casing 101, the heat is transferred using conduction due to thermal contact established between the cells and the casing 101 by the construction of the battery module 100 as will be disclosed in FIGS. 2-7. For effective thermal conduction, the casing 101 is made of a heat conducting material and is formed using an extrusion process. The heat generated by the cells and also by other electronic components, such as, the BMS board, when dissipated to the surroundings, ensures efficient performance of the battery module 100. Hereafter, the outer surface of the enclosing wall 102 is referred to as a second outer surface and an inner surface of the enclosing wall 102 facing towards the cells is referred to as a second inner surface. Similarly, hereinafter the outer surface of the enclosing wall 108 is referred to as a first outer surface and an inner surface of the enclosing wall 108 facing towards the cells is referred to as a first inner surface.

Figure 2:
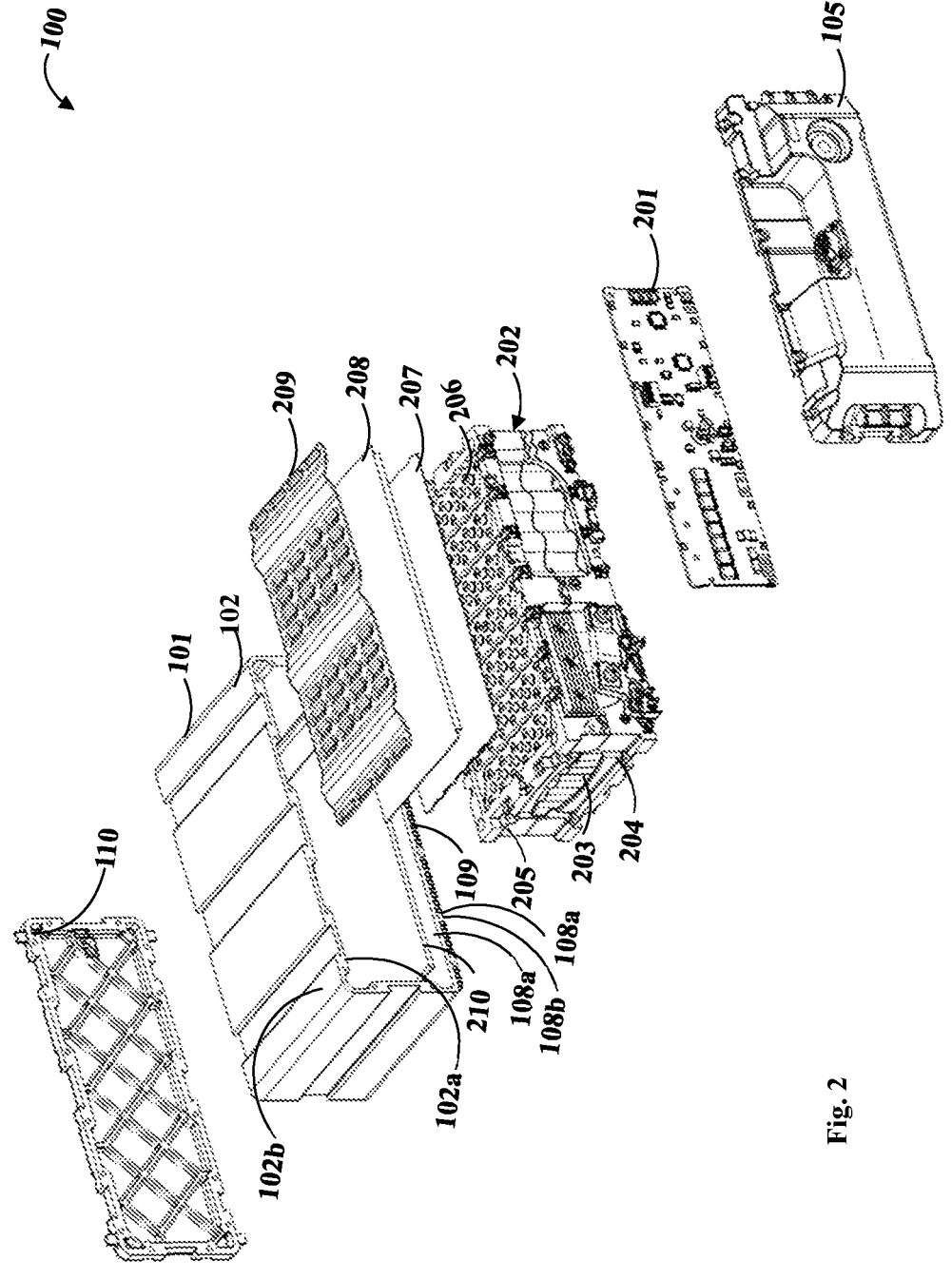
FIG. 2 exemplarily illustrates an exploded perspective view of the battery module illustrated in FIGS. 1A-1B.

FIG. 2 exemplarily illustrates an exploded perspective view of the battery module 100 illustrated in FIGS. 1A-1B. As exemplarily, the battery module 100 comprises the first end cover 105, the second end cover 110, the casing 101, and a battery pack 202. The external casing 101 encloses the battery pack 202 from top and bottom. The second end cover 110 and the first end cover 105 are fastened at the open ends of the casing 101 and enclose the battery pack 202 from rear and front respectively. The battery pack 202 comprises a plurality of cells 203 arranged in a particular sequence between cell holders 204 and 205. The cells 203 are electrically connected in series and/or parallel configuration to form an array of cells using one or more interconnect sheets, such as, 206. Such arrays of cells are electrically connected to a battery management system (BMS) 201 within the battery module 100. The BMS 201 is a printed circuit board with one or more integrated circuits integrally. The battery pack 202 has mounting provisions for the BMS board 201. The BMS board 201 is screwably attached to the cell holders 204 and 205 of the battery pack 202. The BMS board 201 is located between the battery pack 202 and the first end cover 105. The dovetail pattern formed on the interior side of the casing 101 allows easy sliding of the battery pack 202 into the casing 101.

The first outer surface 108b of the casing 101 comprises the heat dissipating structure 109 as exemplarily illustrated in FIG. 1B. On the first inner surface 108a, a cell support structure 210 is integrated to the casing 101. In addition to the battery pack 202, a thermal interface member 207 and a flexible member 209 are positioned within the casing 101. In an embodiment, a coupling member 208 is also positioned in the casing 101 as exemplarily illustrated. As exemplarily illustrated, the thermal interface member 207, the flexible member 209, the cell support structure 210, and the coupling member 208 are positioned around the plurality of cells 203 to establish thermal contact of the cells 203 to the heat dissipating structure 109 on the body of the casing 101.

As exemplarily illustrated, the thermal interface member 207 is positioned in contact with the interconnect sheet 206, proximal to the cell holder 205. In an embodiment, another thermal interface member, such as, 207 may be positioned underneath the cells 203, proximal to the cell holder 204 and the cell support structure 210. In an embodiment, a thermal interface member, such as, 207 may be positioned only between the cell holder 204 and the cell support structure 210. The flexible member 209 is positioned proximal to second inner surface 102a. The coupling member 208 is positioned between the flexible member 209 and the thermal interface member 207.

Figure 3:
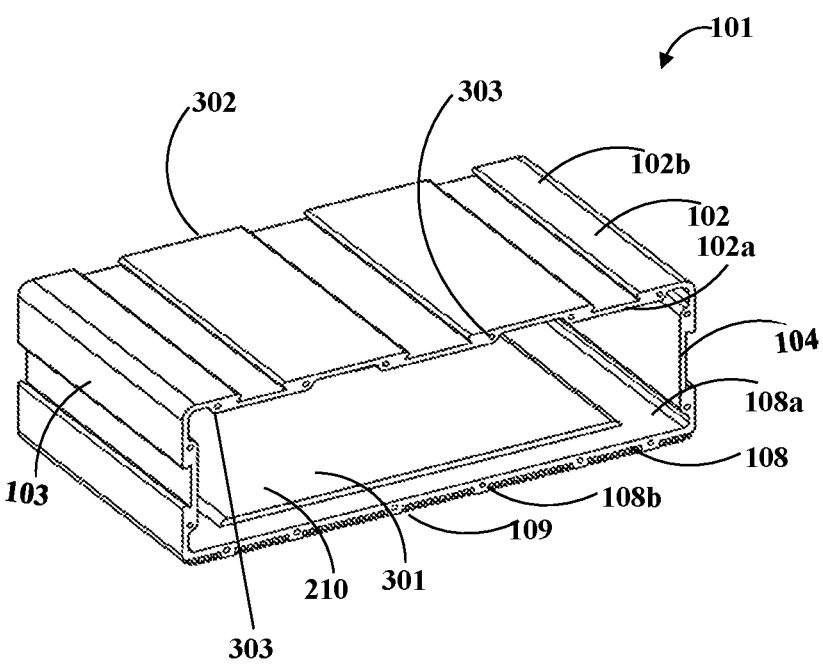
FIG. 3 exemplarily illustrates a front perspective view of a casing of the battery module.

FIG. 3 exemplarily illustrates a front perspective view of the casing 101 of the battery module 100. The casing 101 of the battery module 100 comprises the enclosing walls 102 and 108, the peripheral walls 103 and 104, and the open ends 301 and 302. The open ends 301 and 302 have the mounting provisions, such as, 303 for mounting the end covers 105 and 110 as exemplarily illustrated in FIG. 2. In the inner surface 108a of the enclosing wall 108, the cell support structure 210 is integrated. In an embodiment, the cell support structure 210 is modular and may be positioned above the first inner surface 108a of the casing 101. The cell support structure 210 is a raised slab, of a predetermined thickness, onto which the cell holder such as, 204 is positioned. The cell support structure 210 is made of a thermally conductive material, such as, Aluminum. The cell support structure 210 establishes contact between the cells 203 in the cell holder 204 and the casing 101 and in turn with the heat dissipating structure 109 on the first outer surface 108b. The cell support structure 210 transfers the heat to the first outer surface 108b and the heat dissipating structure 109, such as, the fins allowing natural air to cool the first outer surface 108b. The heat dissipating structure 109 on the first outer surface 108b guides cool air or liquid around the first outer surface 108b. The temperature of the cell support structure 210 is reduced and in turn the cells 103 that are in contact with the cell support structure 210.

In an embodiment, a thermal interface member 207 may be positioned beneath the cell holder 204 and in thermal contact with the cells 203. The thermal interface member 207 is, then, in thermal contact with the cell support structure 210. Such an assembly of the cell holder 204, the thermal interface member 207, and the cell support structure 210 ensures there no gap for air to accumulate in the casing 101 for effective heat transfer from the cells 203 to the casing 101. The cell support structure 210 is strong and adequately rigid to not deform under frequent loading and unloading of the battery pack 202 from the casing 101 as well as at higher temperatures. In an embodiment, the cell support structure 210 has guides on its sides to aid in loading and unloading of the battery pack 202 from the casing 101. In an embodiment, the cell support structure 210 extends over the area of the first inner surface 108a.

Figure 4:
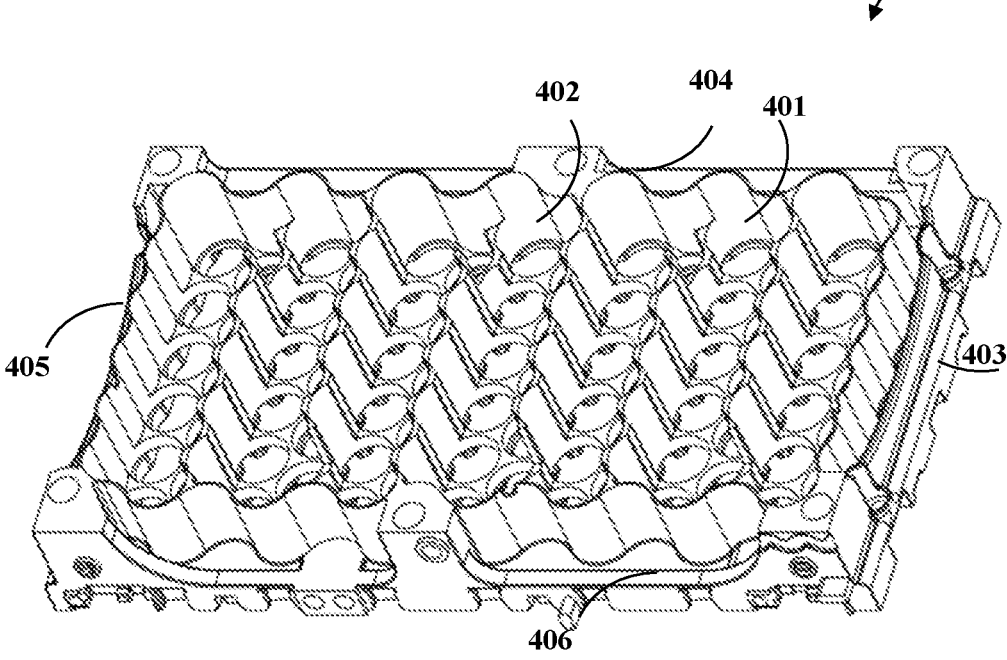
FIG. 4 exemplarily illustrates a top perspective view of a cell holder in the battery module, as per an embodiment of the present invention.

FIG. 4 exemplarily illustrates a perspective view of a cell holder 204 of a battery module 100 as exemplarily illustrated in FIG. 2. As disclosed earlier, the battery pack 100 comprises the cell holders 204 and 205 and the BMS board 201 is removably attached to the cell holders 204 and 205. The cell holder 204 is a bottom cell holder and the cell holder 205 is a top cell holder. Each of the cell holders, such as, 204 comprise placeholders 401 for holding the cells 203 in each cell holder 204. Each of the cell holders 204 comprises a planar surface, such as, 402 with the placehold-
ers 401 and raised walls, such as, 403, 404, 405, and 406 at
the sides of the planar surface 402. The bottom cell holder
204 is positioned at the bottom of the cells 203 and the top
cell holder 205 is positioned on top of the cells 203. The cell
holders 204 and 205 are fixed together using a plurality of
fasteners to tightly hold the cells 203 in the placeholders
401. The raised walls, such as, 403, 404, 405, and 406 of the
cell holders 204 and 205 come in contact with each other,
when the cell holders 204 and 205 are fixed together. To
fasten the cell holders 204 and 205 together, recesses to
position the fasteners are provided in the cell holders 204
and 205. As an embodiment, the cell holders 204 and 205
may be rectangular in shape and holding cylindrical cells
203 in the placeholders 401. The bottom cell holder 204 is
exemplarily illustrated in FIG. 4. The placeholders 401 are
tubular structures on the planar surface 402 with openings
for the terminals of the cells 203 to protrude and make
contact with the interconnect sheets 206. The construction of
the top cell holder 205 is similar to the construction of the
bottom cell holder 204 exemplarily illustrated on FIG. 2.

One or more interconnect sheets, such as, 206 that con-
nect the terminals of the cells 203 in series and/or parallel
connection is positioned on the rear side of the planar
surface 402. The rear side of the planar surface 402 with the
raised walls 403, 404, 405, and 406 can safely hold the
interconnect sheets 206. Each interconnect sheet 206 elec-
trically connects the terminals of a cluster of cells 203. In an
embodiment, one or more interconnect sheets 206 is posi-
tioned only on the rear planar surface, such as, 402 of either
of the top cell holder 205 or the bottom cell holder 204. In
an embodiment, one or more interconnect sheets 206 may be
positioned in the rear surface of the planar surface 402 of
both the cell holders 204 and 205. The interconnect sheet
206 is electrically conductive and connects the terminals of
the cells 203 to the electrical connections 107 of the battery
module 100. Also, the interconnect sheet 206 is thermally
conductive. In an embodiment, the interconnect sheet 206
has a profile to the lock the cells 203 in the cell holders 204
and 205. Since, the interconnect sheet 206 is in direct contact
with the terminals of the cells 203, the heat generated by the
cells 203 is transferred to the interconnect sheet 206 at the
terminals. Further, the interconnect sheet 206 in the bottom
cell holder 204 is in contact with the thermal interface
member 207 or the cell support structure 210 directly and
transfers the heat to the first inner surface 108*a* and subse-
quently to the first outer surface 108*b* of the casing 101. The
interconnect sheet 206 is rigid and is made of electrically
and thermally conductive material, such as, copper, nickel,
etc. In an embodiment, the battery pack 202 further com-
prises a protective sheet (not shown) positioned above the
interconnect sheet 206 of the battery pack 202 for protecting
the soldered points of electrical connection on the intercon-
nect sheet 206. The protective sheet (not shown) is electri-
cally insulated, while being thermally conductive. The pro-
tective sheet is also accommodated in the rear side of the
planar surface 402 and in direct contact with the intercon-
nect sheet 206. In an embodiment, the thermal interface
member 207 may be positioned on the protective sheet.

Figure 5:
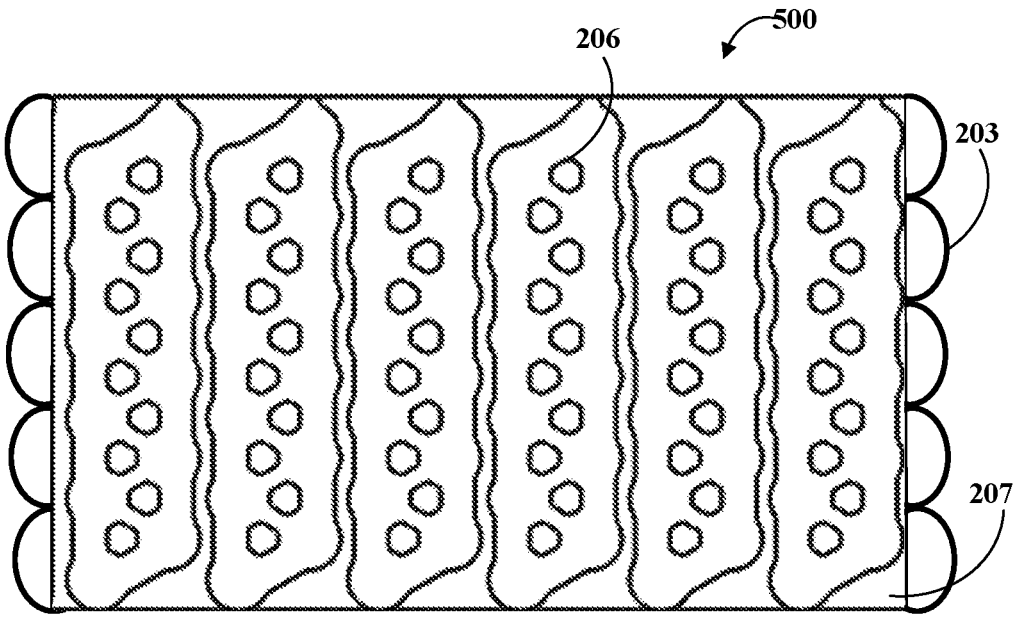
FIG. 5 exemplarily illustrates a plan view of an assembly of an interconnect sheet and a thermal interface member of the battery module.

FIG. 5 exemplarily illustrates a plan view of an assembly
500 of the interconnect sheet 206 and the thermal interface
member 207 of the battery module 100. As exemplarily
illustrated, the thermal interface member 207 is positioned
in direct contact with the interconnect sheet, such as, 206.
In an embodiment, another thermal interface member (not
shown) is positioned in the rear of the planar surface 302 of
each of the top cell holder 205 as exemplarily illustrated in FIG. 2 and the bottom cell holder 204. In an embodiment,
the battery module 100 comprises only one thermal interface
member 207 and the thermal interface member 207 is
positioned between the bottom cell holder 204 and the cell
support structure 210 of the casing 101. The thermal inter-
face member 207 is electrically insulating and thermally
conductive. The thermal interface member 207 establishes
direct thermal contact between the terminals of the cells 203
between the top cell holder 205 and the bottom cell holder
204 with the cell support structure 210 integrated to the first
inner surface 108*a* of the casing 108. The thermal interface
member 207 is pre-formed and removably positioned
between the bottom cell holder 204 and the cell support
structure 210. In an embodiment, the thermal interface
member 207, made of materials, such as, silicone, rubber,
that adheres to the rear of the planar surface 302 of the
bottom cell holder 204. In an embodiment, the thermal
interface member 207 is relatively firm or stiff at room
temperatures and softens and fills the gap between the
bottom cell holder 204 and the cell support structure 210 at
higher temperatures. Since the thermal interface member
207 is electrically insulating, the thermal interface member
207 prevents occurrence of short circuit between the cells
203 in the bottom cell holder 204 and the cell support
structure 210 of the casing 101. In an embodiment, the
thermal interface member 207 has cut-outs corresponding to
the cut-outs in one or more interconnect sheets, such as, 206
for heat and reaction gases in the cells 203 to exhaust out of
the cell holders 204 and 205.

Figure 6:
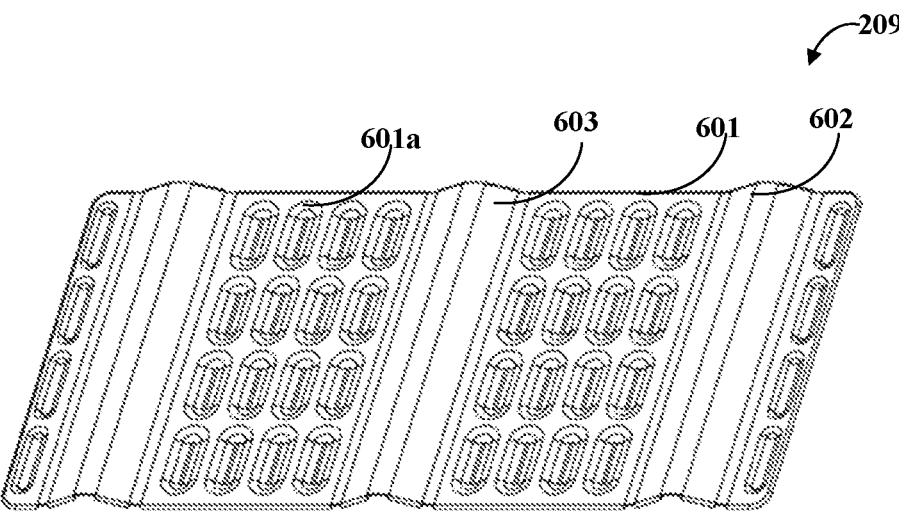
FIG. 6 exemplarily illustrates a top perspective view of a flexible member of the battery module.

FIG. 6 exemplarily illustrates a top perspective view of
the flexible member 209 of the battery module 100. As
exemplarily illustrated in FIG. 2, the flexible member 209 is
positioned between the second inner surface 102*a* of the
casing 101 and the coupling member 208. In an embodi-
ment, the flexible member 209 is positioned between the
second inner surface 102*a* of the casing 101 and the top cell
holder 205 of the battery pack 202. In another embodiment,
the flexible member 209 is in thermal contact with the
second inner surface 102*a* and the protective sheet (not
shown) of the battery pack 202 placed in the top cell holder
205. In an embodiment, the flexible member 209 is posi-
tioned between the second inner surface 102*a* and the
thermal interface member 207 in proximity with the top cell
holder 205. In another embodiment, the flexible member 209
may be positioned between sides of the battery pack 202 and
the peripheral walls 103 and 104 of the casing 101. The
flexible member 209 is a thermally conductive member that
exerts a compressive force against the battery pack 202. The
dimensions, such as the length and breadth of the flexible
member 209 are larger than the corresponding dimensions of
the casing 101. In an embodiment, the dimensional profile of
the flexible or compliant or elastic member 209 is chosen
based on the compressive force to be applied on the battery
pack 202. The compressive force applied on the battery pack
202 or the top cell holder 205 pushes the battery pack 202
towards the thermal interface member 207 positioned under-
neath the bottom cell holder 204. The thermal interface
member 207 is then in thermal contact with the cell support
structure 210 integrated with the casing 101. Thus, the
flexible or elastic member 209 ensures the thermal contact of
the thermal interface member 207 with the cell support
structure 210. In an embodiment, multiple flexible members,
such as, 209 may be inserted into the casing 101. The
flexible member 209 is compressed while assembling the
battery pack 202 in the casing 101.

As exemplarily illustrated, the flexible member 209 is
longitudinally slacked forming a series of alternating crests 602 and troughs 601. On a top surface 603, the flexible member 209 comprises a series of depressions 601a in the troughs 601 resulting in bulges at the corresponding locations on the rear side of the top surface 603. The longitudinally slacked flexible member 209 allows for insertion of the flexible member 209 into the casing 101 by compressing it longitudinally. Following this, the flexible member 209 stretches longitudinally to occupy the space between the peripheral walls 103 and 104 of the casing 101. The crests 602 and the troughs 601 occupy the spaces between the second inner surface 102a of the casing 101 and the battery pack 202. The bulges on the rear side of the top surface 603 exert compressive force on the battery pack 202 underneath the flexible member 209. In an embodiment, the crests 602 and the troughs 601 occupy the spaces between the second inner surface 102a of the casing 101 and the coupling member 208 In an embodiment, the crests 602 and the troughs 601 occupy the spaces between the second inner surface 102a of the casing 101 and the thermal interface member 207 positioned on the cell holder 205. The flexible member 209, is for example, an elastic spring plate.

Figure 7:
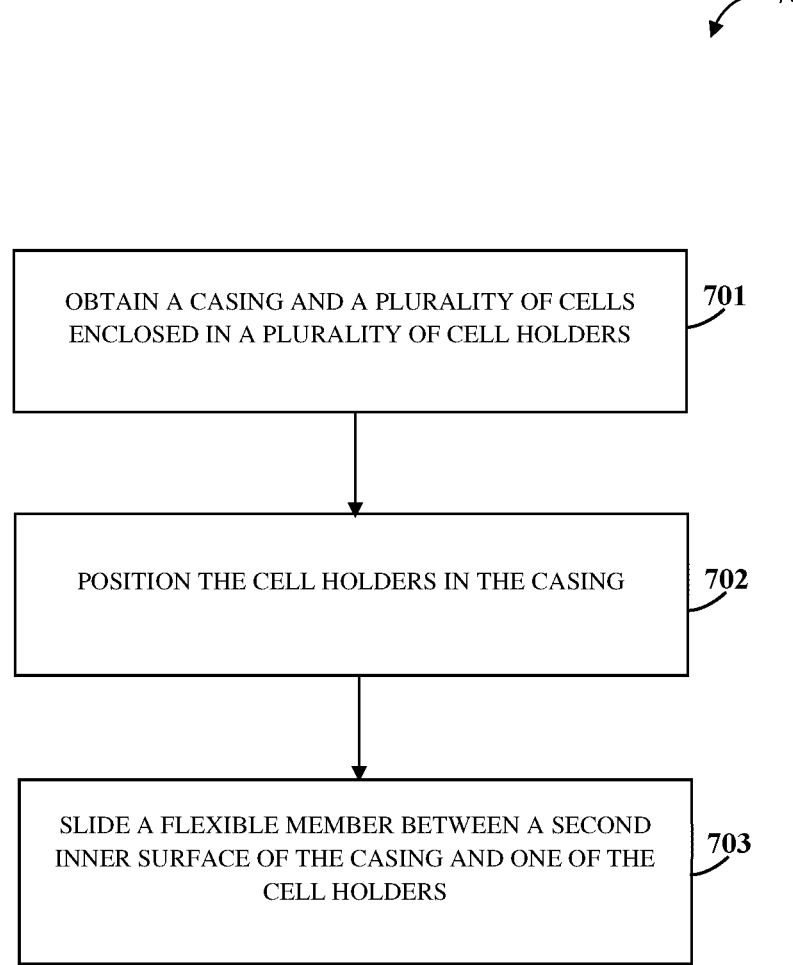
FIG. 7 exemplarily illustrates a flowchart depicting a method comprising steps for assembly of the battery module.

FIG. 7 exemplarily illustrates a flowchart 700 depicting a method comprising steps for assembly of the battery module 100 exemplarily illustrated in FIG. 2. The method comprises: at step 701, obtaining a casing 101 and multiple cells 203 enclosed in multiple cell holders 204 and 205 as exemplarily illustrated in FIG. 2. The casing 101 comprises the first inner surface 108a and the second inner surface 102a. The cell support structure 210 is integrated with the first inner surface 108a of the casing 101. At step 702, the cell holders 204 and 205 with the cells 203 are positioned in the casing 101. The cells 203 between the cell holders 204 and 205 are in thermal contact with the cell support structure 210. At step 703, a flexible member 209 is slid between second inner surface 102a of the casing 101 and one of the cell holders, that is, the top cell holder 205 to obtain the battery module 100. The flexible member 209 exerts pressure on the cell holders 204 and 205 to establish positive thermal contact between the cells 203 and the cell support structure 210.

In an embodiment, at least one thermal interface member 207 is inserted between the flexible member 209 and the top cell holder 205 in the battery module 100. In another embodiment, the thermal interface member 207 is inserted between the bottom cell holder 204 and the cell support structure 210. In an embodiment, the assembly of the battery module 100 further comprises a step of inserting a coupling member 208 between the second inner surface 102a of the casing 101 and the flexible member 209. In another embodiment, as exemplarily illustrated in FIG. 2, the coupling member 208 is inserted between the flexible member 209 and one of the cell holders, such as, the top cell holder 205. The assembly of the battery module 100 further comprises a step of integrating a heat dissipating structure 109 to a first outer surface 108b of the casing 101 for dissipating the heat generated by the cells 203 in thermal contact with the first inner surface 108a of the casing 101, to external environment. The heat dissipating structure 109 is one of fins, coolant channels, and an aeration device.

The different embodiments of the battery modules with various orders of assembly of the thermal interface member, the flexible member, the coupling member, the cell support structure, and the heat dissipating structure provides technical advancements in the field of heat management in battery modules. The casing of the battery module with the integrated cell support structure ensures firm thermal contact between the cells and the casing. The integrated cell support structure is formed during the process of molding of the casing or may be integrated on site using suitable attachment means. The integrated cell support structure during the process of molding saves the cost of extra components such as fasteners, adhesives to attach the cell support structure to the casing. The thermal interface member between the interconnect sheet of the cell and the cell support structure ensures electrical insulations of the cell terminals, avoiding any instance of electrical short circuit in the battery module. However, the thermal interface member provides thermal conductivity, effectively transferring heat from the cell terminals to the cell support structure. The heat dissipating structure formed on the first outer surface of the casing enables cooling of the casing from outside, whose effect is transferred to the terminals of the cells through the thermal contact of the cell support structure with the thermal interface member and the interconnect sheet connecting the cell terminals. The first outer surface of the casing has the flexibility of accommodating different heat dissipating structures, such as, fins, aeration device, coolant channels due to the wider surface area of the first outer surface.

The positioning of the flexible member on top of the cell holders in proximity with the second inner surface of the casing results in generating an elastic push force or pre-load onto the cell holders to have thermal contact between the cell terminals with the thermal interface member and the cell support structure in the casing. The slacked flexible member when inserted in the casing experiences a tension or pre-load due to the tight assembly of components within the casing. This tension translates into the push force on the cell holders. In case, still an air gap remains after assembly of the thermal interface member, the flexible member, and the cell support structure, the coupling member is additionally inserted into the casing for a tight packaging of the cells and associated components in the casing to ensure thermal contact of the cells with the thermal interface member, in turn with the cell support structure thereby additionally addressing any geometrical tolerance variations. The coupling member resembles the cell support structure in material and dimensions.

Such an assembly of the battery module ensures effective heat transfer between the cells and the heat dissipating structure on the casing. The heat dissipated effectively ensures thermal stability and durability of the battery module. The coupling member, the flexible member, the thermal interface member, and the cell support structure package the cells efficiently, making the battery module mechanically stable, impact resistant, and vibration proof The resilient nature of the flexible member acts as a vibration absorber that is experienced by the casing of the battery module. The cell support structure allows easy sliding in and sliding out of the battery pack from the casing. During the assembly of the battery module, the insertion of the flexible member is simple and requires only sliding to fit into the space between the second inner surface and the cell holders. In cases where the same casing is used for battery packs of different capacity, the flexible member in multiple units and/or along with one or more coupling members will fill the gap between the battery pack and the casing. In an embodiment, only dimensions of the flexible member are to be altered if the gap between the battery pack and the casing is varied. By retaining the same flexible or elastic member or altering the flexible member and/or quantity of elastic member and/or coupling member, the cost of redesigning the casing and the cell holders is completely avoided, thereby saving manufacturing cost of the new battery module and giving tremendous flexibility for a manufacturer to have variety of battery packs with various capacities to cater to different product variants, different markets etc. without compromising on the complexity of manufacturing, increasing variety as well as complexity of assembly while overcoming the contradictory requirements of effective heat dissipation while still being electrically insulating.

Improvements and modifications may be incorporated herein without deviating from the scope of the invention.

We claim:

1. A battery module of a powered device comprising:
a plurality of cells positioned in one or more cell holders;
a casing enclosing the plurality of cells positioned in the one or more cell holders, wherein the casing comprises a first inner surface, and a second inner surface wherein,
a cell support structure integrated with the first inner surface of the casing for establishing a thermally conducting and electrically insulating contact between the plurality of cells and the first inner surface,
a flexible member is positioned between a second inner surface of the casing and one of the one or more cell holders for exerting a preload pressure on the one or more cell holders to establish the thermally conducting and electrically insulating contact between the plurality of cells and the first inner surface, and
the flexible member positioned between said second inner surface and one of said one or more cell holders is slacked along a length wise direction, the slack filling up one or more gaps formed between said cells and said second inner surface, thereby forming a series of alternating crests and troughs.

2. The battery module of claim 1, further comprising at least one thermal interface member in contact with at least one of the one or more cell holders, the at least one thermal interface member is configured for thermally conducting heat generated by the plurality of cells positioned in the one or more cell holders.

3. The battery module of claim 2, wherein the at least one thermal interface member is positioned between the flexible member and one of the one or more cell holders.

4. The battery module of claim 2, wherein the at least one thermal interface member is positioned between one of the one or more cell holders and the cell support structure.

5. The battery module of claim 2, wherein the flexible member is inserted into a gap between the second inner surface of the casing and one of the one or more cell holders, the insertion of the flexible member being made after assembly of the one or more cell holders and the at least one thermal interface member in the casing.

6. The battery module of claim 2, wherein the at least one thermal interface member is firm at room temperature and configured to soften and fill a gap between one of the one or more cell holders and the cell support structure at higher temperatures for preventing air gaps in a path of conduction of heat generated by the plurality of cells.

7. The battery module of claim 1, wherein the casing further comprises a first outer surface having a heat dissipating structure for dissipating heat generated by the plurality of cells, the plurality of cells are in a thermally conducting and electrically insulating contact with the first inner surface of the casing to external environment, wherein the heat dissipating structure is at least one of a plurality of fins, a plurality of coolant channels, and an aeration device.

8. The battery module of claim 1, further comprising a coupling member positioned between the flexible member and one of the one or more cell holders for exerting a preload pressure on the one or more cell holders resulting in a compact packaging the plurality of cells to establish the thermally conducting and electrically insulating contact between the plurality of cells and the first inner surface.

9. The battery module of claim 1, further comprising a coupling member positioned between the second inner surface of the casing and the flexible member.

* * * * *